Oct. 24, 1939.  B. S. AIKMAN  2,177,511
VEHICLE BRAKE DEVICE
Filed Nov. 19, 1937  2 Sheets-Sheet 1
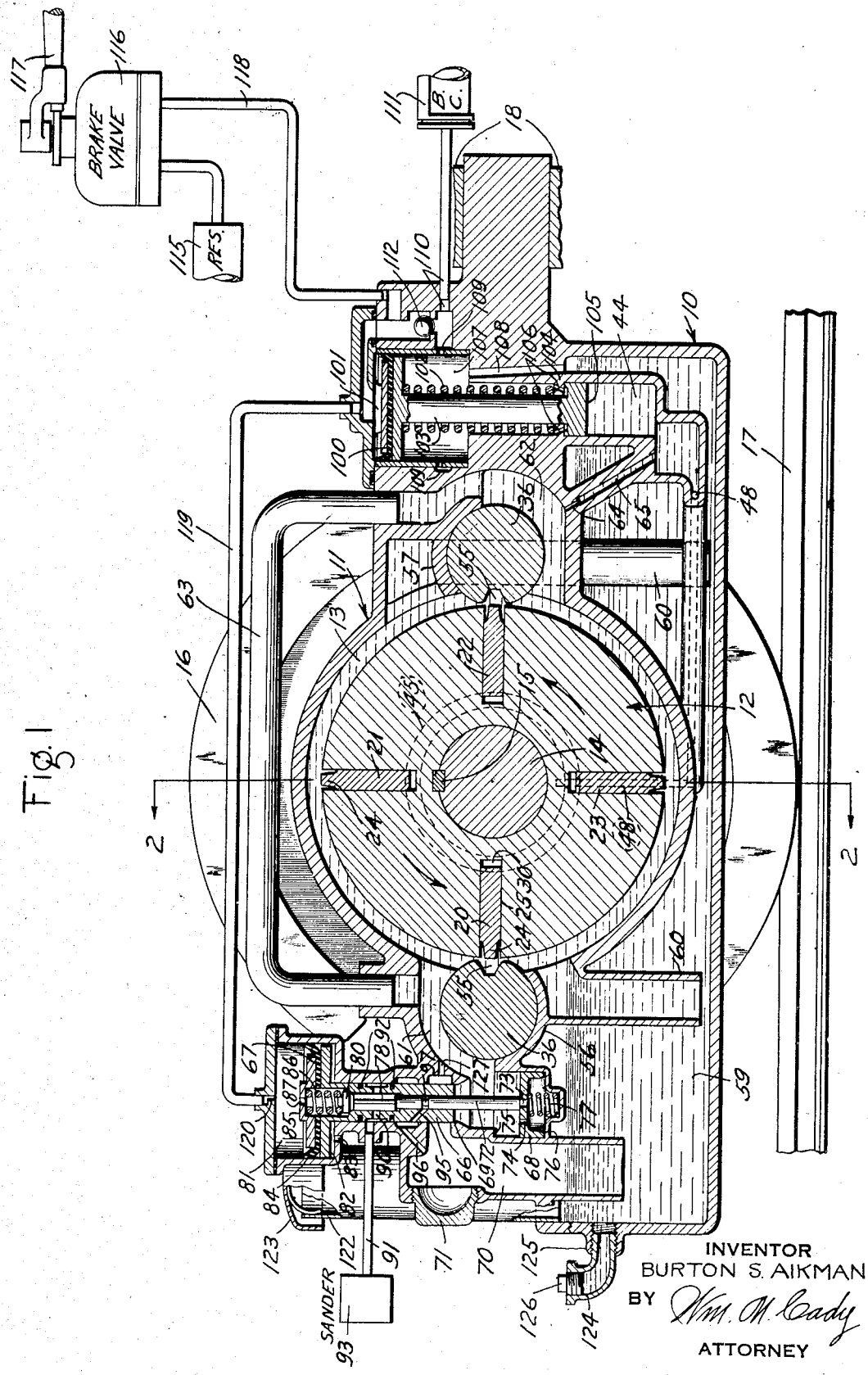
INVENTOR
BURTON S. AIKMAN
BY Wm. M. Cady
ATTORNEY Oct. 24, 1939.    B. S. AIKMAN    2,177,511
VEHICLE BRAKE DEVICE
Filed Nov. 19, 1937    2 Sheets-Sheet 2
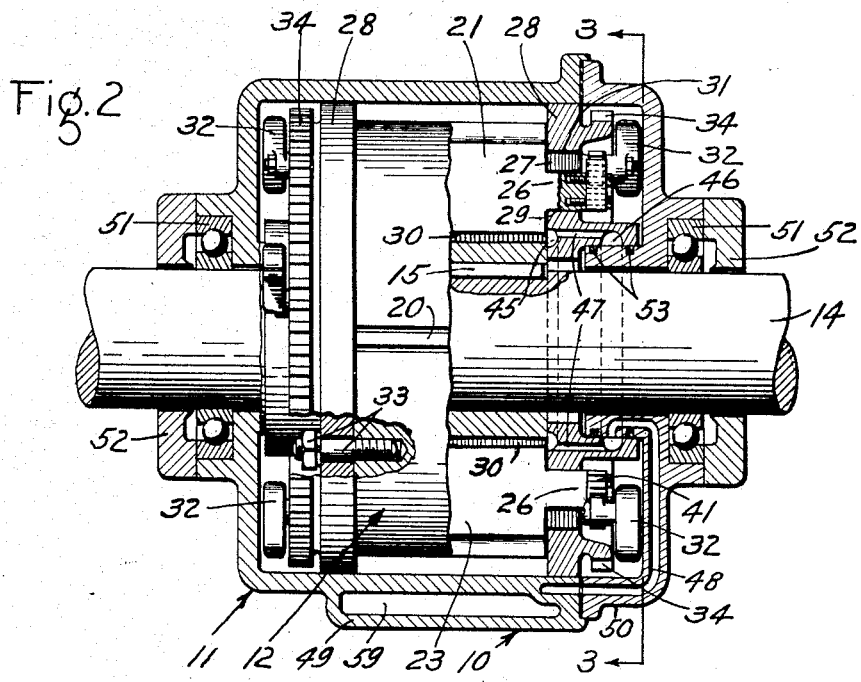
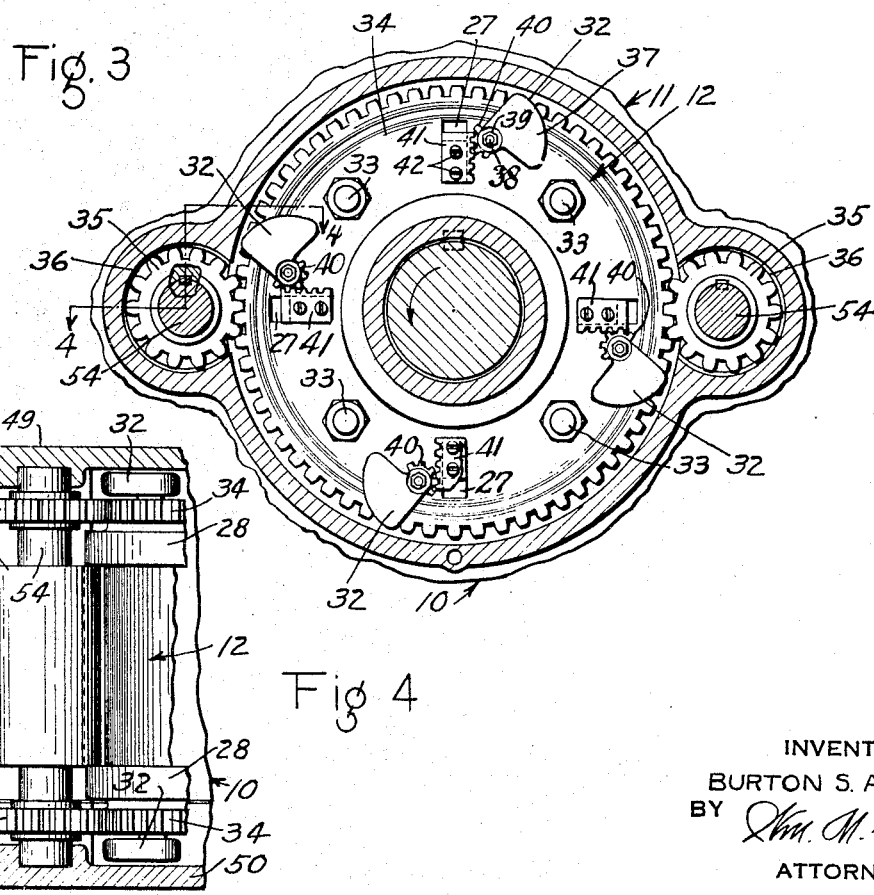
INVENTOR
BURTON S. AIKMAN.
BY *Wm. M. Cady*
ATTORNEY Patented Oct. 24, 1939

2,177,511

UNITED STATES PATENT OFFICE 2,177,511

VEHICLE BRAKE DEVICE

Burton S. Aikman, Wilkinsburg, Pa., assignor to The Westinghouse Air Brake Company, Wilmerding, Pa., a corporation of Pennsylvania Application November 19, 1937, Serial No. 175,416

36 Claims. (Cl. 188—90)

This invention relates to vehicle brake devices, and more particularly to brake devices for vehicles intended to be operated as a part of high speed trains.

In my Patent No. 2,065,203, granted December 22, 1936, and assigned to The Westinghouse Air Brake Company, I have referred to some of the problems incident to the braking of high speed vehicles and trains with conventional type friction brakes, and have described and claimed a type of hydropneumatic brake device proposed as a solution for some of these problems. Again, in my copending application Serial No. 73,855, filed April 11, 1936, also assigned to The Westinghouse Air Brake Company, I have described and claimed another proposed hydropneumatic brake device as an improvement over that disclosed in the aforesaid patent. Since the development of the types of brake devices disclosed in the aforesaid patent and application, I have given a great deal of further study to the problems involved in the braking of high speed trains, as well as to the problems incident to the maintenance and upkeep of brake systems on such trains, and have found that I can greatly improve on the two types of brake devices heretofore proposed by me.

Accordingly, therefore, a principal object of the present invention is to provide a brake device of the hydropneumatic type which is an improvement over the types heretofore proposed by me.

A further object of the invention is to provide a hydropneumatic brake device having a stator member and a rotor member disposed in concentric relationship, with a greatly simplified arrangement of elements for acting upon oil or other fluid present between the rotor and stator members to produce a braking action.

A yet further object of the invention is to provide a brake device of the character referred to in the foregoing object, wherein the rotor member is provided with a plurality of blades or vanes, and the stator member is provided with rotary elements coacting with these blades or vanes and arranged so that the stator elements and the rotor blades act on oil or other fluid trapped in chambers between the rotor and stator elements to produce a positive and substantially uniform braking effect on the rotor member during a braking operation.

Still another object of the invention is to provide a hydropneumatic brake device of the character hereinbefore referred to, with improved means for diminishing the braking effect produced by the brake device upon the slipping of vehicle wheels associated therewith, and for restoring the braking effect when the wheel slipping condition has been relieved.

A still further object of the invention is to provide a hydropneumatic brake device in which not only is the braking effect reduced when the wheels braked by the device begin to slip, but at the same time a sanding device is automatically operated to sand the rails under the wheels so as to improve the adhesion between the slipping wheels and the track rails.

A further object of the invention is to provide an improved form of hydropneumatic brake device in association with an operating device for an air brake mechanism, with the parts so arranged that so long as the hydropneumatic brake device is operating effectively the air brake is held released, but upon decrease in the effectiveness of the hydropneumatic brake device, the air brake is automatically applied.

Further objects and advantages of the invention, dealing particularly with improved constructions and arrangements of parts, which I consider a distinct advance in the art, will be best understood from the following description of an embodiment of the invention, wherein, Fig. 1 shows in schematic and diagrammatic form a hydropneumatic brake device embodying features of the invention.

Fig. 2 is a view, partly in elevation and partly in section, taken substantially along the line 2—2 of Fig. 1, showing details of the brake device not clearly discernible in Fig. 1.

Fig. 3 is a view taken substantially along the line 3—3 of Fig. 2.

Fig. 4 is a fragmentary view taken substantially along the line 4—4 of Fig. 3, with portions of the enclosing casing included in this line cut away to more clearly show the interior parts.

The embodiment disclosed in the drawings has been illustrated in conjunction with a simple straight air brake system, and only sufficient parts have been shown for braking one set of wheels, but this is deemed sufficient inasmuch as those skilled in the art will readily understand the application of the invention to a train of vehicles.

Referring now to the drawings, and in particular to Fig. 1, the hydropneumatic brake device is designated in its entirety by the numeral 10, and comprises generally a stator member 11 and a rotor member 12.

The stator member 11 comprises a casing or housing so shaped as to define a cylindrical chamber 13. The rotor 12 is disposed in the chamber 13, in concentric relationship, and is rigidly secured to and carried by shaft or axle 14. The rotor member 12 may be secured to the axle 14 by means of a key 15. The axle 14 may be an axle which supports two vehicle wheels, one of which is shown at 16 as rolling on a track rail 17, or it may be an auxiliary shaft or axle suitably geared or otherwise coupled to a standard vehicle axle. In either event the rotor member 12 rotates at a speed corresponding to vehicle speed, while the stator member 11 is suitably secured to some part of the vehicle truck, as for example the part shown in fragmentary form at 18. The manner of this connection with the vehicle truck need not be specifically dealt with here, because the like connection of vehicle drive motors with the truck has long been a matter of common practice and a similar connection may be employed with the hydropneumatic brake device.

Considering further the rotor member as illustrated, it is provided with four blades or vanes 20, 21, 22 and 23. These blades or vanes are duplicates of each other, and are substantially rectangular in form, the outermost edge of each being tapered or beveled as indicated at 24. Each blade is slidably disposed in a rectanguluar recess or slot 25, in the rotor, and each has projecting from each vertical edge thereof a lug 26, which may be more clearly seen in Fig. 2. Each lug 26 passes through a slot 27 in an end plate member 28. The slot 27 is so arranged that when the associated blade is in its innermost position, that is, retracted inwardly toward the axis of the rotor, the inner edge of the lug 26 will strike the inner edge 29 of the slot 27 before the inner edge of the blade has reached the end of the slot or recess 25 in the rotor. This will then leave a small space or chamber between the innermost edge of the blade and the end of the rotor slot 25, as indicated at 30.

When the associated vane or blade is forced outwardly of the slot 25, the outermost edge of the lug 26 will engage the outermost edge 31 of the slot 27 just as the outermost edge of the blade engages the circular wall of the stator chamber 13. Thus the limit of inward and outward travel of the blades is determined by the engagement of the lugs 26 with the end walls 29 and 31 of the slots 27.

It will be observed that the rotor member 12 is provided with an end plate 28 at each end, these end plates being bolted to the rotor proper by studs or bolts indicated at 33. Preferably formed integrally with each end plate is a ring gear 34. As best seen in Fig. 3, each ring gear 34 meshes with a pinion 35 associated with a roller 36 carried by the stator, and of which further description will be given later.

Also carried by each end plate 28 are four centrifuge devices 32. Each of these devices comprises a triangular shaped weight 37 which is pivotally mounted on a pin 38 projecting from the plate 28, and held thereon by nuts 39. Formed integrally with the weight 37, and partially concentric to the pin 38, is a segmental gear 40. This segmental gear engages with a rack 41 secured by screws 42 to one of the lugs 26 which is associated with one of the stator blades. The centrifuge devices 32, of which there are two for each rotor blade, are so arranged that when the rotor is rotating above a low predetermined speed, the centrifugal force acting on the weights 37 will turn the segmental gears 40 in a direction such that the rotor blades 20, 21, 22 and 23 are retracted inwardly, and assume positions such as indicated in Figs. 1 to 3.

The rotor blades may be forced outwardly upon supply of fluid under pressure to the chambers 30 at the innermost edges of the blades. Fluid under pressure may be supplied to the several chambers 30 in the rotor member from a blade pressure chamber 44 in the stator member, by means of a communication which includes an annular recess 45 in the right hand end plate member 28, as viewed in Fig. 2, a second annular recess 46 in the same member, which is connected by a plurality of ports 47 to the annular recess 45, and a passage 48 in the stator member (which is at all times in open communication with the annular recess 46) leading to the blade pressure chamber 44. The chamber 44 is normally supplied with oil and pressure thereon is produced as will hereinafter be described.

Considering now the stator member 11, this member comprises a main casing section 49 and an end casing section 50. The two sections are provided with ball bearings 51 for supporting the shaft or axle 14, and each bearing has a cap member 52 for retaining the ball bearings in place. The end casing member 50 contains the aforementioned passage 48 which registers with the annular recess 46 in the rotor end plate member 28, and to prevent leakage at the junction point of these two passages, packing rings 53 are provided.

As is best seen in Figs. 1 and 3, the stator member is provided with two roller elements 36, each of which is carried by a shaft 54, one end of the shaft being journaled in the main casing section 49 and the other end being journaled in the end casing section 50. As is clearly seen in Fig. 4, the two pinions 35 associated with a roller element 36 are secured to the shaft 54. This shaft is journaled in the casing sections in a manner such that it is parallel to shaft 14 and so that the pinions 35 at all times remain in mesh with the driving ring gears 34.

Each of the roller members 36 is cylindrical in shape and its disposition is such that its periphery is tangential to the periphery of the rotor member. Further, each roller member is provided with a tapered slot 55 into which the tapered end 24 of each rotor blade may be projected. The ratio between the gears 34 on the rotor member and the pinions 35 associated with the roller members is such that for the four blades shown, each roller member makes one revolution for each quarter revolution of the rotor member. Thus if the blades on the rotor member are projected outwardly, each time a rotor blade comes adjacent a roller member the slot 55 therein will be in position to receive the tapered end 24 of the blade, and the blade may thus remain in the outer position while rotating. Movement of the tapered end 24 into the slot 55 will take place without undue friction, yet the fit between the two will be sufficiently close to prevent the escape of any quantity of liquid therethrough.

In addition to the support for each roller 36 provided by the journaled shaft 54, the main casing section 49 is provided with an inner wall 56 having a bearing fit with the left hand roller member 36, as viewed in Fig. 1, and a similar inner wall 57 having a like bearing fit with the right hand roller member 36, as viewed in the same figure. These two inner walls provide additional support for the roller members and prevent distortion of these members when subject to the high pressures exerted on the fluid in the chamber 13, as will more fully appear later.

The stator casing sections are shaped to provide a liquid supply chamber 59 for containing a liquid, as for example an oil, upon which the stator and rotor members act to produce a braking effect. Projecting into the supply chamber 59 are conduits 60 which provide communication between the supply chamber 59 and the stator chamber 13. The stator is also provided with two discharge chambers 61 and 62 which are connected by a conduit or pipe 63. In addition, the chamber 62 is in restricted communication with the blade pressure chamber 44 by way of a restricted port 64 and passage 65.

For controlling the degree of braking produced by the brake device, and for also functioning to correct a wheel slipping condition in the incipient stage, there is provided a mechanism in the stator casing which includes a regulating valve 66, a regulating piston 67, and a dash-pot piston 68. The arrangement of these elements is best seen in Fig. 1. As there shown, the valve 66 coacts with a seat 69 to control communication between the discharge chamber 61 and a conduit or passage 70 leading to the supply chamber 59. A plug 71 is provided in the conduit 70 which when removed permits inspection of the valve 66 and its seat 69.

The valve 66 is apertured longitudinally thereof to pass a stem 72. The lower end of this stem rests upon the dash-pot piston 68, and directly under the end of this stem in the dash-pot piston 68 is a relatively large port 73. In parallel with this large port is a small or restricted port 74. The dash-pot piston 68 is slidable in a chamber formed in the casing between an upper position defined by a stop 75 and a lower position defined by an end wall 76. The end wall is recessed to hold in place a spring 77 acting on the lower side of the dash-pot piston.

The upper end of the stem 72 engages the fluted stem 78 of a wheel slip control valve 80, which normally rests in a seated position at the end of the aperture extending through the regulating valve 66. As will be observed, the regulating valve 66 is formed integrally with the regulating piston 67. This piston is subject on its uppermost side to pressure of fluid in chamber 81 and on its lowermost side to pressure in a chamber 82, which latter chamber is always open to the atmosphere by way of port 83. The piston 67 is provided with the usual packing 84 held in place by follower plate 85. A spring 86 reacts between the lower side of the follower plate 85 and the top of the wheel slip control valve 80, and thus normally urges this valve to seated position.

The follower plate 85 is provided with a large port 87, while the upper part of the body of valve 66, which in reality forms the stem of the piston 67, is provided with port and cavity 90 adapted to register with pipe and passage 91 for all positions of the piston 67. On either side of the port and cavity 90 are sealing rings 92. The pipe 91 may be connected to a sanding device diagrammatically indicated at 93. It is to be understood that any type of sanding device may be employed, and for that reason it has been indicated in merely diagrammatic form.

Between the longitudinal aperture in the valve 66 and the periphery is provided a port 95 in registration with a passage 96 in the casing. As will be seen, the passage 96 opens into the conduit 70, while the passage 95 registers with an annular recess 97 in the stem 72 for the illustrated position in Fig. 1. The purpose of this arrangement is to cause any oil which passes up along the stem 72 to flow back to the supply chamber 59. Thus oil escaping up along the stem 72 is prevented from entering the pneumatic passages leading to the sanding device.

For the purpose of producing an initial pressure in the blade pressure chamber 44, to initially force the rotor blades 20, 21, 22 and 23 outwardly, there is provided an initiating piston 100 which is subject on its uppermost side to pressure of fluid in chamber 101 and on its lowermost side to pressure of a spring 102. The spring 102 is concentric with piston stem 103 and reacts between the lower surface of the piston 100 and a casing wall 104. The lower end of the piston 103 terminates in a piston abutment 105 which when actuated downwardly exerts pressure on any fluid contained in the chamber 44. Should any fluid leak past the piston 105 to the chamber thereabove, it may be returned to the supply chamber 59 by way of several ports 106 in the end wall 104, chamber 107 below the piston 100, and passage 108.

When the piston 100 is in its extreme lowermost position, the chamber 101 is opened to ports 109 in the side wall of the piston chamber, which ports communicate with pipe and passage 110 leading to a brake cylinder 111 for operating a friction brake associated with the vehicle wheels. Air under pressure normally supplied to the chamber 101 is prevented from being supplied to the brake cylinder 111 before the piston 100 opens communication through the ports 109, by the presence of a ball check valve 112. It will be observed that air under pressure established in the brake cylinder 111 may be released therefrom past the ball check valve 112 even though the piston 100 is in an upper position.

As will now be apparent, the operation of the brake device may be controlled by supplying air under pressure to the two piston chambers 81 and 101. Air may be supplied to these two chambers by any suitable means, and as an illustration I have shown a reservoir 115, constituting a source of air under pressure, and an engineer's brake valve device 116. This engineer's brake valve device may be of any of the usual types, and for the purpose of illustration it will be assumed to be of the self-lapping type. That is to say, it is provided with an operating handle 117 which has a release position and is movable into an application zone, the degree of the movement determining the pressure of air supplied from the reservoir 115 to the two piston chambers 81 and 101. Communication between the brake valve and the two piston chambers is provided by pipes 118 and 119. Between the pipe 119 and the piston chamber 81 is provided a choke or restriction 120, for a purpose which will be discussed presently.

For filling the supply chamber 59 with oil I have provided a filling pipe 122 and a cap 123 therefor. As will be observed, the cap is made slightly larger than the opening in the pipe so as to provide for breathing. Further, it is desirable that the supply chamber be filled to a predetermined level which is best suited for most efficient operation. In order to determine this level, I have provided an L pipe fitting 124 screwed into a lug 125 in a side wall of the supply chamber, and provided with a plug fitting 126. When filling the chamber through the filling pipe 122, plug 126 is removed and when oil begins to run out of the fitting 124 the proper level has been reached.

Further understanding of the invention will be best facilitated by describing the operation of the embodiment illustrated.

Operation

With the brake device described installed on a vehicle, so long as the vehicle is running the rotor 12 will be rotating at a speed corresponding to vehicle speed. The centrifugal force acting on the weights 37 of the centrifuge devices 32 will hold the several rotor blades 20, 21, 22 and 23 retracted inwardly. As the rotor thus rotates it will draw a small quantity of oil from the supply chamber 59 up through the intake conduits 60 and into the chamber 13 to keep the rotating parts properly lubricated. Some of the oil thus passing into the chamber 13 will flow into the blade pressure chamber 44 through the restricted port 64 and passage 65. Spring 102 will hold the piston 100 in its uppermost position so that the volume of the chamber will be a maximum for the free running condition of the rotor.

The regulating valve 66 and its controlling piston 67, and the other parts associated therewith, will be substantially in the positions illustrated in Fig. 1. As will be observed, the regulating valve 66 will be resting upon its seat 69 and will thus close communication between the discharge chamber 61 and the return conduit 70. However, such oil as is drawn into the chamber 13 may escape back to the supply chamber 59 by way of a small escape port 127.

It should, therefore, be obvious that with the rotor blades retracted inwardly the rotor will not be subject to any substantial opposing force and as a consequence no braking effect will be produced on the vehicle wheels associated therewith.

If it is desired to produce a braking effect, the brake valve handle 117 is turned into the application zone to a degree depending upon the desired degree of braking. Fluid under pressure will then be supplied from the reservoir 115 to the two pipes 118 and 119 to a like degree. The ball check valve 112 will at this stage prevent supply to the air brake cylinder 111.

Now due to the presence of the choke 120 in the communication to the regulating piston chamber 81, a high pressure will be quickly established in the piston chamber 101 before a substantial pressure has been established in the chamber 81. As a result, the initiating piston 100 will promptly move downwardly and cause piston 105 to exert a high pressure on the oil in blade pressure chamber 44. Oil from this chamber will then be forced into the chambers 30, at the innermost edges of the rotor blades, and will thus force the rotor blades outwardly against the opposing force produced by the centrifuges 32. While some oil may escape from chamber 44 into the stator chamber 13, by way of the restricted port 64, this escapage will be small and will not appreciably affect the movement of the rotor blades outwardly for at least a definite interval of time.

As soon as the rotor blades move outwardly, and contact the inner wall of the chamber 13, the oil trapped between each pair of rotor blades and the stator wall will be carried around with the rotor and as the forward blade engages with a recess 55 in one of the rollers 36, the following blade will force the oil so trapped into one or the other of the two discharge chambers 61 and 62 and exert pressure thereon. From the discharge chambers the oil will escape past the regulating valve 66 back to the supply chamber 59. In addition, oil from the discharge chamber 62 will flow under pressure through the restricted port 64 and passage 65 to the blade pressure chamber 44, and from thence to the chambers 30 and thus maintain the rotor blades in their outermost position. It will also be observed that the rotor blades will remain in their outermost position so long as the device is effective in producing braking and each outer end 24 of each blade will periodically pass into the slots 55 of the rollers 36 as the rotor member 12 rotates.

Considering now the action of the regulating piston 67, as the rotor blades move outwardly and produce pressure on the oil, the initial pressure acting below the regulating valve 66 readily shifts this valve upwardly to permit the escape of the oil into the conduit 70 and back to the supply chamber 59, because due to the presence of the choke 120 a substantial air pressure has not been developed in the piston chamber 81. The valve 80 moves upwardly with the valve 66 (which is integral with the piston 67) and is still held in seated position by spring 86. Due to the close fit between the stem 72 and the aperture in the regulating valve 66, the stem also moves upwardly with the valve and uncovers the large port 73 in the dash-pot piston 68. Oil now flows from the discharge chamber 61 through this large port to the underside of the piston and as the pressures on both sides of the piston equalize the spring 77 causes the dash-pot piston to follow the stem upwardly. The oil trapped below the dash-pot piston will tend to maintain the regulating valve 66 in its raised position, but, as will be seen presently, will permit it to drop slowly as the oil beneath the dash-pot piston 68 escapes through the small port 74 back into the discharge chamber 61.

Now the air pressure is constantly building up in the chamber 81 and tends to force the regulating piston 67 downwardly. If the air pressure should build up in this chamber faster than the dash-pot piston permits the valve 66 to move downwardly without unseating the valve 80, the force on the piston 67, due to the air pressure in chamber 81, may move it and the valve 66 relative to the stem 72, thus unseating the valve 80 and permitting the escape of air pressure from chamber 81 through port 87 and past the now unseated valve 80 to port and cavity 90, and from thence through pipe and passage 91 to the sanding device 93.

Air supplied to the sanding device will cause sand to be deposited on the rails so as to increase the adhesion between wheels and rails. Just as soon as the dash-pot piston 68 moves downwardly and permits the valve 80 to again seat, sanding will be terminated. While sanding at this stage of the application may not be desired in every instance, it, together with the effect of the dash-pot piston in preventing a too sudden reclosure of the regulating valve following the initial pressure established in the chamber 13, tends to prevent wheel slipping when initially effecting a brake application, and also causes the initial application to be somewhat cushioned.

Now as the dash-pot piston 68 moves downwardly and reaches its lowermost position, and the air pressure in chamber 81 gradually builds up to its full value, it will be apparent that the regulating valve 66 will be subject on its lowermost side to the pressure exerted on the oil delivered to the discharge chamber 61, and on its upper side to the air pressure exerted on the piston 67. The unit pressure exerted on the oil in the brake device will, of course, be many times the unit pressure in the piston chamber 81. Thus the piston 67 is made considerably larger in area than the area of the valve 66 exposed to the oil in the chamber 61.

The ultimate degree of braking produced on the rotor, and consequently that on the wheel 16, will be determined by the balance between the pressures acting below and above the regulating valve. That is to say, the regulating valve will assume a position with respect to its seat such that the back pressure of the oil against the rotor blades will be proportional to the pressure of the air in piston chamber 81. For this condition valve 80 will be in seated position. It should, therefore, be apparent that with the rotor rotating and the blades thereon maintained in their outermost position, a braking effect will be produced on the vehicle proportional to the air pressure delivered by the brake valve device 116.

As fast as oil is discharged into the two discharge chambers 61 and 62, it will be replenished by supply drawn from the chamber 59 up through the intake ducts or conduit 60. Moreover, for each quarter revolution of the rotor a braking effect will be produced thereon on one side between one rotor blade and one roller element, and diametrically opposite a like braking effect will be produced thereon by another blade and roller element. The stresses on the rotor are therefore balanced.

It should also be apparent that the pressure maintained on the oil in the blade pressure chamber 44 acts on the piston 105. The areas of pistons 105 and 100 are selected such that during normal braking the force on piston 105 exceeds that developed on the piston 100 due to air pressure in chamber 101. The piston 105 will be then shifted to its uppermost position during normal braking, as illustrated. Such oil as may escape past the piston 105 is, of course, returned to the supply chamber by way of the ports 106 and passage 108. Similarly, any oil which passes up along the stem 72 is returned to the supply chamber through the passages 95 and 96.

By manipulating the brake valve handle 117, the initial degree of the brake application may be increased or decreased as desired. If the pressure in the regulating piston chamber 81 is subsequently increased, the regulating valve 66 will be forced downwardly to more nearly close the orifice formed between it and the seat 69, and thus the pressure on the oil expelled into the discharge chambers 61 and 62 will be similarly increased. If the pressure in the regulating piston chamber 81 is diminished, the valve 66 will move upwardly to more readily permit the escape of oil from the discharge chambers 61 and 62. The degree of the application may be thus varied as readily and with the same degree of accuracy as in standard and well known brake systems.

Now a characteristic feature of the hydropneumatic brake device is that as the speed of the rotor diminishes, the degree of pressure established on the oil will at some low rotor speed diminish, first slowly and then rapidly, and will become substantially zero as the rotor ceases rotating. When the pressure on the oil first commences to decrease, the regulating valve 66 will move downwardly in an effort to maintain the balance between pressure on the oil and air pressure acting on the piston 67. Eventually the valve 66 will close and oil will flow only from the discharge chamber 61 through the port 127. When this takes place the braking on the rotor will have diminished to a value much too low to properly bring the vehicle to a stop.

As the pressure on the oil diminishes, that in chamber 44 also diminishes, and the air pressure acting on the piston 100 which remains constant, will force it downwardly until the piston uncovers the ports 109. Air under pressure will then flow to the brake cylinder 111 to apply the friction brake. From this operation it will be seen that when the effectiveness of the hydropneumatic brake device diminishes appreciably below that corresponding to the air pressure established, the friction brake will be applied to insure that the vehicle will be stopped and will be held at rest.

To release the brakes after the vehicle has been brought to a stop, or at any time before stopping, the brake valve handle 117 is turned to the release position, to release air under pressure from the chambers supplied thereby. As will be obvious, this will condition the parts of the hydropneumatic brake device so that no effective braking will result, and will release air under pressure from the brake cylinder 111, if supplied thereto, to also release the friction brake.

If now at any time the hydropneumatic brake device is in operation the wheels braked thereby should begin to slip, that is, diminish in speed below normal, the pressure exerted on the oil will immediately drop. At the instant before the pressure on the oil begins to drop the regulating valve 66 will be at some raised distance above its seat 69. At the instant the pressure drops, the regulating valve 66 will move downwardly due to the overbalancing pressure of the air in chamber 81. Now as the valve 66 moves downwardly the stem 72 remains stationary, because it is in engagement with the dash-pot piston 68 which is already in its lowermost position. As a consequence, the wheel slip control valve 86 is unseated, and thus permits air under pressure to flow from chamber 81 to the sanding device 93. Sanding device 93 then deposits sand on the rails so as to improve the adhesion between wheels and rails.

At the same time, due to the presence of the choke 120 between the pipe 119 and the piston chamber 81, the pressure in chamber 81 drops faster than it can be maintained by flow of air through the choke 120, so that the pressure of the oil acting below the regulating valve 66 now overbalances the air pressure acting on piston 67, and the valve 66 promptly moves upwardly. As it does so it seats the valve 80 and terminates the release of air from the chamber 81. This also terminates the supply of air to the sanding device, but this device will continue sanding so long as air under pressure is present in its storage chamber.

As the regulating valve 66 moves upwardly due to the diminished air pressure in chamber 81, the stem 72 moves with it, and uncovers the large port 73 in the dash-pot piston 68. Oil quickly flows through this large port to the under side of the dash-pot piston, and spring 77 causes the piston to promptly follow the stem 72.

With valve 80 seated the air pressure builds up in chamber 81, but the piston 67 cannot move the valve 66 downwardly any faster than permitted by the downward movement of the dash-pot piston 68, which moves down slowly due to the slow escape of oil through the small port 74. This prevents a too rapid build up of pressure on the oil in chamber 13 following relief of the wheel slipping condition, and is intended to permit the wheels to return to normal speed before the full braking effect is reestablished.

During the time that the pressure on the oil in chamber 13 was diminished during the wheel slipping condition, the downward pressure on piston 100 tended to force the oil out of chamber 44. But before the oil is exhausted from this chamber fully enough to permit piston 100 to move downwardly to a position where ports 109 are opened, the wheel slipping condition will be relieved. Thus the air brakes are not applied to aggravate the wheel slipping condition.

If while the vehicle is standing it is desired to effect an application of the brakes, as for example to hold the vehicle at rest on a slight grade, the brake valve handle 117 is moved to application position so as to supply air under pressure to pipe 118 and the connected volumes. With the vehicle standing the rotor member 12 will be ineffective to produce pressure on the oil in chamber 13, so that the air pressure in piston chamber 101 will force piston 100 downwardly and thus permit air under pressure to flow through ports 109 to brake cylinder 111. It follows therefore that the air brakes only will be applied. A short interval of time will elapse while the piston 100 is moving downwardly, against the pressure of oil in chamber 44, but this interval is of no practical importance since the vehicle is already at rest.

It should now be clear that the hydropneumatic brake device herein illustrated and described is much simpler in construction than, and possesses many advantages over, the similar brake devices disclosed in my patent and application hereinbefore referred to. It should further be apparent that this improved brake device can be made sufficiently rugged to withstand the most severe service to which it may be subject, and that the construction proposed is along well established lines. While an air brake system has been described as auxiliary to the hydropneumatic brake system, this is to be understood as merely illustrative of any other type of fluid pressure brake system.

While I have illustrated the invention in a single form only, it is not my invention that it shall be construed as limited to this precise form only but it is more fully defined in the appended claims.

Having now described my invention, what I claim as new and desire to secure by Letters Patent, is:

1. In a fluid type brake device, in combination, a rotor member, a stator member enclosing said rotor member, a plurality of blades carried by said rotor member and being movable inwardly and outwardly in a radial direction, a plurality of rotary elements carried by said stator member and coacting with said plurality of rotor blades when they are in an outer position to act upon a fluid contained in said stator member to produce a braking effect on said rotor member, and means operable upon initiating the operation of said brake device to cause said rotor blades to move outwardly, and to cause said blades to be maintained in an outer position by pressure exerted on said fluid to produce said braking effect.

2. In a fluid type brake device, in combination, a rotor member, a stator member coacting with said rotor member and being adapted to contain a fluid, a plurality of vanes carried by said rotor member and being movable inwardly and outwardly in a radial direction, a plurality of rotary elements carried by said stator member and coacting with said rotor blades when they are in an outer position, to act upon a fluid contained in said stator member to produce a braking effect on said rotor member, and means actuated by a control pressure for initially causing an outward movement of said rotor blade, and being so arranged that the pressure produced on the fluid in said brake device is operative to maintain said rotor blades in their outward position during the braking operation.

3. In a fluid type brake device, in combination, a stator member having a fluid containing chamber therein, a rotor member disposed in said chamber, a blade carried by said rotor member and being movable inwardly and outwardly in a radial direction, a rotary element carried by said stator and coacting with said rotor blade when in an outward position to act upon the fluid contained in said chamber to produce a braking effect on said rotor member, means for establishing an air pressure to control the operation of said brake device, and means responsive to said air pressure for causing an outward movement of said rotor blade, the pressure thereafter exerted on the fluid in said stator chamber being effective to maintain said rotor blade in its outward position during a braking operation.

4. In a vehicle brake system, in combination, a rotor member, a stator member enclosing said rotor member, a blade carried by said rotor member and being movable inwardly and outwardly thereof in a radial direction, a rotary element carried by said stator member and coacting with said rotor blade when in an outward position to act upon a fluid contained in said stator member to produce a braking effect on said rotor member, a centrifuge device carried by said rotor member for holding said rotor blade in its inner position during rotation of said rotor, and means controlled by fluid pressure for actuating said stator blade outwardly and for maintaining it in an outward position when a braking operation is desired.

5. In a fluid type brake device, in combination, a rotor member, a stator member enclosing said rotor member, a plurality of blades carried by said rotor member and being movable inwardly and outwardly thereof in a radial direction, a plurality of rotary elements carried by said stator member and coacting with said rotor blades when in an outward position to act upon a fluid contained in said stator member to produce a braking effect on said rotor member, means for establishing an air pressure to control the operation of said brake device, and means responsive to said air pressure for initially acting upon a selected portion of the fluid in said brake device to cause the outward movement of said stator blade, and being so arranged that the pressure exerted on said fluid by the joint action of said rotor blades and said stator rotary elements maintains said blades in the outward position.

6. In a fluid type brake device, in combination, a rotor member, a stator member enclosing said rotor member and being adapted to contain a fluid, a plurality of blades carried by said rotor member and being movable inwardly and outwardly thereof in a radial direction, a plurality of rotary elements carried by said stator member and coacting with said rotor blades when in the outward position to act upon said fluid in said stator member to produce a braking effect on the rotor member, centrifuge means for urging said rotor blades to their inward position when the rotor is rotating, means for establishing an air pressure to control the operation of said brake device, and means responsive to said air pressure for initially causing the outward movement of said rotor blades, and being so arranged that the pressure exerted on the fluid in said brake device maintains said rotor blades in the outward position.

7. In a vehicle brake device, in combination, a stator member having a chamber, a rotor member operable in said chamber, a plurality of blades carried by said rotor member and being movable inwardly and outwardly in a radial direction, a plurality of rotary elements carried by said stator member and coacting with said rotor blades when in the outward position to act upon a fluid in said stator member to produce a braking effect on said rotor member, a plurality of centrifuge devices operable when said rotor is rotating to urge said stator blades to an inner position, a control chamber containing a fluid and having communication with chambers at the inner edges of said rotor blades, means operable when initiating operation of said brake device to produce a pressure on the fluid in said control chamber to force said rotor blades to the outward position, the pressure in said control chamber being thereafter maintained by the action of said rotor blades and stator rotary elements.

8. In a fluid type brake device, in combination, a stator member having a chamber adapted to contain a fluid therein, a rotor member operable in said chamber, a plurality of blades carried by said rotor member and being movable inwardly and outwardly thereof in a radial direction, a plurality of rotary elements carried by said stator member and coacting with said rotor blades when in the outward position to act upon the fluid in said stator chamber to produce a braking effect on said motor member, a plurality of centrifuge devices carried by said rotor member for urging said rotor blades inwardly when the rotor is rotating, means for establishing a regulatory air pressure for controlling the operation of said brake device, means responsive to said regulatory air pressure for exerting a fluid pressure on said rotor blades to force them outwardly, and means so constructed and arranged that the pressure exerted on the fluid in said stator chamber by said rotor blades and rotary elements is effective to maintain said rotor blades in the outward position.

9. In a fluid type brake device, in combination, a stator member having a chamber adapted to contain a fluid therein, a rotor member operable in said chamber, a blade carried by said rotor member and being movable inwardly and outwardly thereof in a radial direction, a rotary element carried by said stator member and being adapted to coact with said rotor blade to act upon the fluid in said chamber to produce a braking effect on said rotor member, means for establishing a regulatory air pressure to control the operation of said brake device, and means controlled by said regulatory pressure for controlling the degree of braking effect produced by said brake device.

10. In a vehicle brake device, in combination, a stator member having a chamber therein adapted to contain a fluid, a rotor member operable in said chamber, a blade carried by said rotor member and being movable inwardly and outwardly thereof in a radial direction, a rotary element carried by said stator member and being adapted to be rotated in synchronism with the rotation of said rotor member, said rotary element and rotor blade coacting upon the fluid contained in said stator chamber to produce a braking effect on the rotor member by discharge of said fluid under pressure through an orifice, means for establishing a regulatory air pressure, and means controlled by said regulatory air pressure for controlling the discharge of oil under pressure through said orifice.

11. In a vehicle brake system, in combination, a stator member, a rotor member, a plurality of blades carried by said rotor member and being movable inwardly and outwardly in a radial direction, a plurality of rotary elements carried by said stator member, means for rotating said rotary elements and said rotor member in synchronism with each other, whereby said rotary elements and stator blades act upon a fluid contained in said stator member to produce a braking effect on said rotor member, means for establishing a regulatory air pressure, and valve means controlled by said regulatory air pressure for controlling the pressure exerted on said fluid in said stator member.

12. In a fluid type brake device, in combination, a rotor member, a stator member enclosing said rotor member, a plurality of blades carried by said rotor member and being movable inwardly and outwardly thereof in a radial direction, a plurality of elements arranged to be rotated in synchronism with the rotation of said rotor member, and being disposed and shaped to coact with said rotor blades when in the outward position to act upon a fluid to produce a braking effect on said rotor member, centrifuge means for urging said rotor blades inwardly when the rotor is rotating, means for establishing a regulatory air pressure, means responsive to said regulatory air pressure for effecting an outward movement of said rotor blades, and means also responsive to and controlled by said regulatory air pressure for controlling the degree of braking effect produced by said brake device.

13. In a fluid type brake device, in combination, a stator member having a chamber adapted to contain a fluid, a rotor operable in said chamber, a plurality of blades carried by said rotor member and being movable inwardly and outwardly thereof in a radial direction, a plurality of rotary elements carried by said stator member, means for causing said rotor member and said rotary elements to be rotated in synchronism, said rotary elements and said rotor blades being operable when the blades are in an outer position to act upon the fluid in said chamber to produce a braking effect, means for establishing a regulatory air pressure for controlling the operation of said brake device, means responsive to the establishment of said regulatory air pressure for causing an outward movement of said rotor blades, and being so arranged that the pressure exerted on the fluid in said chamber is effective in maintaining said blades in the outward position, and means also governed by said regulatory air pressure for controlling the degree of braking effect produced by said brake device.

14. In a fluid type brake device, in combination, a stator member having a chamber adapted to contain a fluid, a rotor member operable in said chamber, a plurality of blades movable inwardly and outwardly of said rotor member into said stator chamber, a plurality of rotary elements carried by said stator and arranged to be operated in synchronism with the rotation of said rotor member, means responsive to the speed of operation of said rotor member, and means so arranged that both said last means and the pressure exerted on the fluid in said stator chamber control the inward and outward movement of said rotor blades, said rotor blades being effective in their outer position to coact with said stator rotary elements to act upon the fluid in said stator chamber to produce a braking effect, and being ineffective in their inner position to produce a braking effect.

15. In a vehicle brake device, in combination, a stator member having a chamber therein adapted to contain a fluid, a rotor member operable in said chamber, a plurality of blades carried by said rotor member and being movable inwardly and outwardly thereof in a radial direction, a plurality of rotary elements carried by said stator member and coacting with said rotor blades in the outward position to act upon the fluid in said stator chamber to produce a braking effect, centrifuge means carried by said rotor member, and piston means subject to a regulatory air pressure, said last two means being so arranged as to jointly control the inward and outward movement of said rotor blades.

16. In a vehicle brake device, in combination, a stator member having a chamber therein adapted to contain a fluid, a rotor member operable in said chamber, a plurality of blades carried by said rotor member and being movable inwardly and outwardly thereof in a radial direction, a plurality of rotary elements carried by said stator member and coacting with said rotor blades in the outward position to act upon the fluid in said stator chamber to produce a braking effect, centrifuge means carried by said rotor member, piston means subject to a regulatory air pressure, said last two means being so arranged as to jointly control the inward and outward movement of said rotor blades, and means also subject to said regulatory air pressure for controlling the degree of braking effect produced by said brake device.

17. In a fluid type brake device, in combination, a stator member having a chamber adapted to contain a fluid therein, a rotor member operable in said chamber, means carried by both said rotor and stator members for producing pressure on the fluid in said chamber to produce a braking effect on the rotor member, means operable upon a sudden reduction in the speed of rotation of said rotor member due to slipping of vehicle wheels braked thereby for effectively reducing the pressure produced on said fluid, and means operative in response to the reduction of said pressure for effecting the operation of a device assisting in the restoration of the rotor member, and thereby the associated wheels, to normal speed.

18. In a fluid type brake device, in combination, a stator member having a chamber adapted to contain a fluid therein, a rotor member operable in said chamber, a blade carried by the rotor member, an element carried by the stator member coacting with said rotor blade to produce a pressure on the fluid in said stator chamber to produce a braking effect, valve means for controlling the pressure exerted on said fluid to thereby control the degree of the braking effect, means associated with said valve means for actuating said valve means to reduce the pressure on said fluid upon a sudden reduction in the speed of rotation of said rotor member due to slipping of vehicle wheels associated therewith, and means controlled by the operation of said last means for controlling the operation of an auxiliary device to assist in effecting return of the rotor member to normal speed.

19. In a fluid type brake device, in combination, a stator member, a rotor member, means associated with said stator and rotor members and being so constructed and arranged that when said rotor member is rotating pressure is produced on a fluid contained in said stator member to produce a braking effect on said rotor member, said rotor member being associated with vehicle wheels to thereby produce a braking effect on said wheels, means subject to opposing fluid pressures for controlling the degree of braking effect produced by said rotor and stator members, means operative upon a sudden reduction in the speed of rotation of said rotor member due to slipping of the vehicle wheels for effecting a variation in at least one of said opposing pressures, and means operative in response to the said variation in one of said opposing pressures for operating a means to relieve the slipping of the vehicle wheels.

20. In a vehicle brake device, in combination, a stator member having a chamber therein adapted to contain a fluid, a rotor member operable in said chamber, means associated with said stator and rotor members for producing pressure on said fluid in said chamber to produce a braking effect, means for establishing a regulatory air pressure for controlling the degree of braking effect produced by said brake device, means controlled by said regulatory pressure for controlling the degree of pressure exerted on said fluid and thereby controlling the degree of braking effect, and means operative upon a sudden reduction in the speed of rotation of said rotor member due to the slipping of vehicle wheels associated therewith for effecting a reduction in said regulatory air pressure.

21. In a vehicle brake device, in combination, a stator member having a chamber adapted to contain a fluid, a rotor member operable in said chamber, means associated with said stator and rotor members for producing a pressure on the fluid in said chamber when the said rotor member is rotating to thereby produce a braking effect, valve means for controlling a communication leading from said stator chamber to control the pressure exerted on said fluid, means for establishing a regulatory pressure, means controlled by said regulatory pressure for controlling the operation of said valve means to cause the degree of pressure exerted on said fluid to correspond to the degree of the regulatory pressure, and means operative upon a reduction in the speed of rotation of said rotor member due to the slipping of vehicle wheels associated therewith for effecting a reduction of said regulatory pressure.

22. In a fluid type brake device, in combination, a stator member having a chamber therein adapted to contain a fluid, a rotor member operable in said chamber, means associated with said stator and rotor members for producing a pressure on said fluid when said rotor is rotating, means for producing a regulatory pressure, valve means controlled by said regulatory pressure for controlling the degree of pressure produced on said fluid in said stator chamber, the pressure on said fluid being reduced upon a sudden reduction in the speed of rotation of said rotor member due to a slipping of vehicle wheels associated therewith, and means operative upon the sudden reduction of pressure on said fluid for effecting a reduction in said regulatory pressure.

23. In a fluid type brake device, in combination, a stator member having a chamber therein adapted to contain a fluid, a rotor member operable in said chamber, means associated with said stator and rotor members for producing a pressure on said fluid when said rotor is rotating, means for producing a regulatory pressure, valve means controlled by said regulatory pressure for controlling the degree of pressure produced on said fluid in said stator chamber, the pressure on said fluid being reduced upon a sudden reduction in the speed of rotation of said rotor member due to a slipping of vehicle wheels associated therewith, means operative upon the sudden reduction of pressure on said fluid for effecting a reduction in said regulatory pressure, and means operative in response to reduction of said regulatory pressure for establishing a communication through which fluid under pressure can flow to a sanding device.

24. In a fluid type brake device, in combination, a stator member having a chamber adapted to contain a fluid therein, a rotor member operable in said chamber, means associated with said stator and rotor members for producing a pressure on said fluid when said rotor member is rotating, means for establishing a regulatory air pressure, valve means comprising two relatively movable parts for controlling the degree of pressure produced on said fluid, said valve means being subject both to said regulatory air pressure and to the pressure exerted on said fluid, and said parts being movable relative to each other upon a sudden reduction in the pressure exerted on said fluid due to slipping of the vehicle wheels associated with the said rotor member, and means operative upon the relative movement of said valve parts for effecting a reduction in said regulatory air pressure.

25. In a vehicle brake device, in combination, a stator member, a rotor member, means associated with said stator and rotor members for producing pressure on a fluid contained in said stator member to thereby produce a braking effect on wheels associated with said rotor member, valve means for controlling the pressure maintainable on said fluid, means operative upon a sudden reduction in the speed of rotation of said rotor member due to slipping of the vehicle wheels associated therewith for causing an operation of said valve means to effectively reduce the pressure maintainable on said fluid, and means for controlling the subsequent operation of said valve means to cause it to operate with a delayed action whereby the pressure originally maintainable on said fluid cannot be reestablished for an interval of time.

26. In a fluid type brake device, in combination, a stator member having a chamber arranged to contain a fluid, a rotor member coacting with said stator member to produce a pressure on said fluid to produce a braking effect on vehicle wheels associated with said rotor member, valve means for controlling a port leading from said stator chamber to thereby control the pressure produced on said fluid, means operative upon the sudden reduction in the speed of rotation of said rotor member due to slipping of the vehicle wheels associated therewith for causing said valve means to open said port to effectively reduce the pressure produced on said fluid, said valve means being subsequently operative to partly close said port to restore the pressure produced on said fluid, and means for delaying the subsequent operation of said valve means for a predetermined length of time.

27. In a fluid type brake device, in combination, a stator member having a chamber containing a fluid, a rotor member operable in said chamber to produce a pressure on said fluid, means for producing a regulatory air pressure, valve means responsive to said regulatory air pressure for controlling a port leading from said stator chamber to thereby control the degree of pressure exerted on said fluid in accordance with the degree of regulatory pressure established, means operative in response to a sudden reduction in the speed of rotation of said rotor member due to slipping of vehicle wheels associated therewith for causing said valve means to open wide said port to effectively reduce the pressure exerted on said fluid, said valve means being subsequently operative by said regulatory air pressure to partially close said port so that full pressure may again be produced on said fluid, and means for delaying the said closing operation of said valve means for a predetermined interval of time.

28. In a fluid type brake device, in combination, a rotor member, a stator member having a chamber containing both a fluid and said rotor member, means associated with said stator and rotor member for producing a pressure on the fluid contained in said stator chamber to thereby produce a braking effect on vehicle wheels associated with said rotor member, means for producing and maintaining a regulatory air pressure, valve means subject to and controlled by said regulatory air pressure for controlling a port from said stator chamber and being operative to control the pressure exerted on said fluid in accordance with the degree of regulatory air pressure established, and means so constructed and arranged that upon a sudden reduction in the speed of rotation of said rotor member due to slipping of the vehicle wheels a sudden reduction of said regulatory air pressure is effected to thereby effect a corresponding reduction in the pressure exerted on said fluid, and whereby to cause operation of said valve means subsequently to permit pressure to be exerted on said fluid at a predetermined increasing rate.

29. In a fluid type brake device, in combination, a stator member having a chamber containing a fluid, a rotor member operable in said chamber, a plurality of blades associated with said rotor member and being movable inwardly and outwardly thereof in a radial direction, coacting elements carried by said stator member and cooperating with said rotor blades when in an outer position to produce pressure on the fluid contained in said chamber to produce a braking effect, means for establishing a regulatory pressure, means immediately responsive to the establishment of said regulatory pressure for effecting the movement of said rotor blades to an outer position, and means more slowly responsive to the establishment of said regulatory pressure for controlling the degree of pressure exerted on said fluid and thereby controlling the degree of braking effect produced.

30. In a fluid type brake device, in combination, a stator member having a chamber adapted to contain a fluid, a rotor member operable in said chamber, a plurality of blades carried by said rotor member and being movable from an inner position to an outer position to coact with said stator member to produce a pressure on said fluid and thereby produce a braking effect, means for establishing a regulatory pressure, means immediately responsive to the establishment of said regulatory pressure for effecting a movement of said rotor blades to the outer position, means also responsive to the establishment of said regulatory pressure for controlling the degree of pressure exerted on said fluid and thereby controlling the degree of braking effect produced, and means associated with said last means for causing the initial pressure exerted on said fluid to be gradually increased to a degree corresponding to the degree of the regulatory pressure established.

31. In a fluid type brake device, in combination, a stator member having a cylindrical chamber adapted to contain a fluid, a rotor member disposed in said chamber and adapted to rotate in concentric relation with the periphery of said chamber, a plurality of blades carried by said rotor member and adapted to be actuated from an inner position to an outer position in contact with the periphery of said stator chamber, said rotor blades being maintainable in the outer position so long as said rotor is rotating and a braking effect is desired, means associated with said stator member and coacting with said rotor blades when in their outer position to produce a pressure on the fluid in said stator chamber to produce a braking effect, and means for causing the movement of said rotor blades to their outer position and for maintaining them there by pressure exerted on said fluid when a braking effect is produced.

32. In a fluid type brake device, in combination, a stator member having a cylindrical chamber adapted to contain a fluid, a rotor disposed in and rotatable in said chamber in concentric relationship with the periphery of said stator chamber, a plurality of blades carried by said rotor member and being movable inwardly and outwardly thereof in a radial direction, said blades being adapted in their outer position to contact the inner surface of said stator chamber, a plurality of rotary devices associated with said stator member for coacting with said rotor blades when in their outer position to produce a pressure on the fluid in said chamber to thereby produce a braking effect, and means for controlling the inward and outward movement of said rotor blades by means of fluid pressure acting thereon.

33. In a fluid type brake device, in combination, a stator member having a cylindrical chamber adapted to contain a fluid, a rotor member disposed in said chamber and being arranged to rotate in concentric relationship with the inner periphery of said chamber, a plurality of blades carried by said rotor member and being movable from an inner position to an outer position in contact with the inner periphery of said chamber, rotary elements carried by said stator member for coacting with said rotor blades when in their outer position to produce a pressure on the fluid in said stator chamber to thereby produce a braking effect, and regulating valve means for controlling the degree of pressure produced on said fluid.

34. In a fluid type brake device, in combination, a stator member having a cylindrical chamber adapted to contain a fluid, a cylindrical rotor member disposed in said chamber and rotatable in concentric relationship with the inner periphery of said chamber, a plurality of blades carried by said rotor member and being movable by fluid pressure from an inner position to an outer position and maintainable there by fluid pressure in contact with the inner periphery of said chamber, a plurality of rotary elements carried by said stator member and arranged to rotate on axes parallel to that of the rotor member, the axes of the rotary elements being disposed with relation to the axis of the rotor member such that the periphery of each rotary element is tangential to the periphery of the rotor member, each of the said rotary elements having an axially extending slot adapted to receive the outer end of a rotor blade, and means for rotating said rotary elements in synchronism with the rotation of said rotor member, whereby as a rotor blade approaches a rotary element the outer end of the blade enters the slot in the rotary element, said blades and rotary elements coacting to produce a pressure on the fluid contained in said chamber to thereby produce a braking effect.

35. In a fluid type brake device, in combination, a stator member having a cylindrical braking chamber adapted to contain a fluid, a circular rotor member operable in said chamber in concentric relation with the inner periphery of said chamber, a plurality of blades carried by said rotor member and being movable inwardly and outwardly thereof in a radial direction, a plurality of rotary elements carried by stator member and coacting with said rotor blades when in their outer position to produce a pressure on the fluid in said chamber to thereby produce a braking effect, a plurality of centrifuge devices on said rotor member for urging said rotor blades to their inner position when the rotor is rotating, each of said rotor blades having a chamber at the innermost edge thereof, an auxiliary chamber in said stator member having communication with each of the chambers at the innermost edge of said rotor blades, an air operated device for producing pressure on fluid in said auxiliary chamber to thereby establish a fluid pressure in each of said blade chambers to thus force said blades outwardly, and means for forming a communication whereby the pressure exerted on the fluid in said stator braking chamber by said rotor blades is effective in forcing fluid to said blade chambers to maintain said blades in their outermost position, 36. In a fluid type brake device, in combination, a stator member having a chamber containing a fluid, a rotor operable in said chamber, means associated with said stator and rotor members for producing a pressure on said fluid to produce a braking effect, control means for controlling the operation of said brake device including movable abutments subject to the fluid pressure in said stator chamber, and means for conveying fluid which may leak past said abutments to a storage chamber from which it is resupplied to said stator chamber.

BURTON S. AIKMAN.